US005814910A

United States Patent [19]

Pelletier

[11] Patent Number: 5,814,910

[45] Date of Patent: Sep. 29, 1998

[54] COOLING VANES FOR ROTATING ELECTRIC MACHINERY

[75] Inventor: Dominic Pelletier, Pepperell, Mass.

[73] Assignee: Eldim, Inc., Woburn, Mass.

[21] Appl. No.: 524,187

[22] Filed: Sep. 6, 1995

[51] Int. Cl.[6] ............................ H02K 1/32; H02K 15/02

[52] U.S. Cl. ................................................ 310/65; 310/42

[58] Field of Search ................................ 310/64, 65, 42, 310/216

[56] References Cited

U.S. PATENT DOCUMENTS

| | | | |
|---|---|---|---|
| 550,468 | 11/1895 | Westinghouse, Jr. | 310/64 |
| 649,574 | 5/1900 | Foshag | 310/65 |
| 662,010 | 11/1900 | Mix et al. | 310/65 |
| 662,928 | 12/1900 | Geisenhoner | 310/65 |
| 854,717 | 5/1907 | Coffman | 310/65 |
| 905,805 | 12/1908 | Forster | 310/65 |
| 925,991 | 6/1909 | Brown | 310/65 |
| 933,737 | 9/1909 | Baird | 310/65 |
| 973,565 | 11/1910 | Reist | 310/64 |
| 1,022,021 | 4/1912 | Farquhar | 310/65 |
| 1,022,023 | 4/1912 | Foster | 310/65 |
| 1,083,822 | 1/1914 | Geisenhoner | 310/65 |
| 1,196,345 | 8/1916 | Field | 310/65 |
| 1,241,503 | 10/1917 | Field | 310/65 |
| 1,515,889 | 11/1924 | Schou et al. | 310/65 |
| 2,282,283 | 5/1942 | Henter | 310/65 |
| 2,381,297 | 8/1945 | Lynn | 310/65 |
| 3,009,072 | 11/1961 | Mossay | 310/57 |
| 3,133,215 | 5/1964 | Porter et al. | 310/65 |
| 3,171,996 | 3/1965 | Alger et al. | 310/51 |
| 3,515,916 | 6/1970 | Kovacs | 310/65 |
| 4,061,937 | 12/1977 | Goel et al. | 310/65 |
| 4,352,034 | 9/1982 | Karhan et al. | 310/59 |
| 4,362,960 | 12/1982 | Gillet | 310/65 |
| 4,542,313 | 9/1985 | Di Pietro | 310/65 |

FOREIGN PATENT DOCUMENTS

| | | | |
|---|---|---|---|
| 229038 | 9/1943 | Switzerland | 310/65 |

*Primary Examiner*—Clayton E. LaBalle
*Attorney, Agent, or Firm*—Testa, Hurwitz & Thibeault, LLP

[57] ABSTRACT

A cooling vane for a rotating electric machine and method for attachment. In one embodiment the cooling vane is a corrugated ribbon of thermally conductive material having a plurality of projection points positioned along one edge of the corrugated ribbon. In another embodiment the vane is periodically twisted to bring a portion of the vane parallel with the plate to which the vane is to be welded. In one embodiment the cooling vane is welded to a stator plate of the machine by positioning the cooling vane perpendicularly adjacent the grounded stator plate and applying a high current source to the cooling vane in the region of the projection point. The high current flow through the projection point welds the cooling vane to the stator plate. A plurality of these cooling vanes are welded to the stator plate radially around the surface of the plate to provide a large surface area and to turbulate the fluid flow for the dissipation of heat which is generated within the machine during operation.

17 Claims, 4 Drawing Sheets

FIG. 7
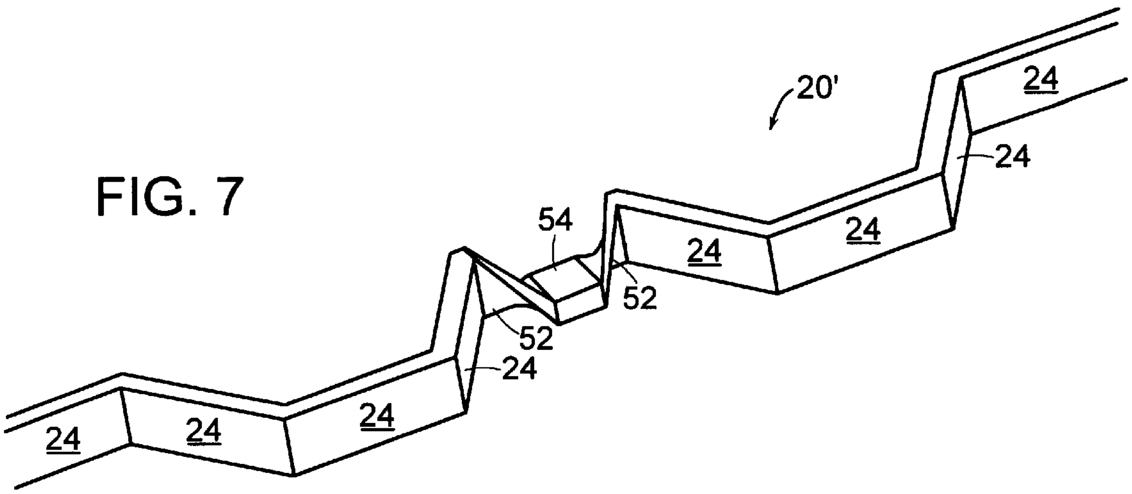
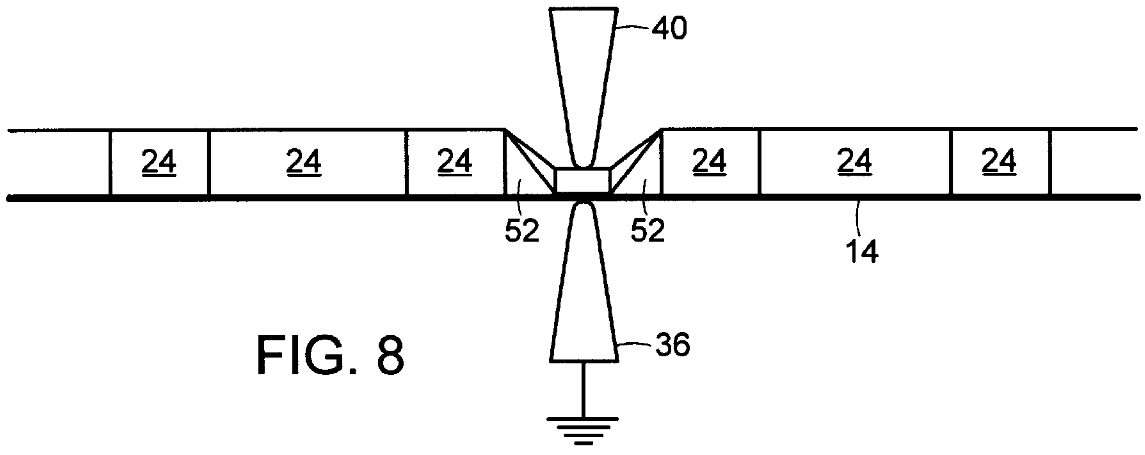
FIG. 8
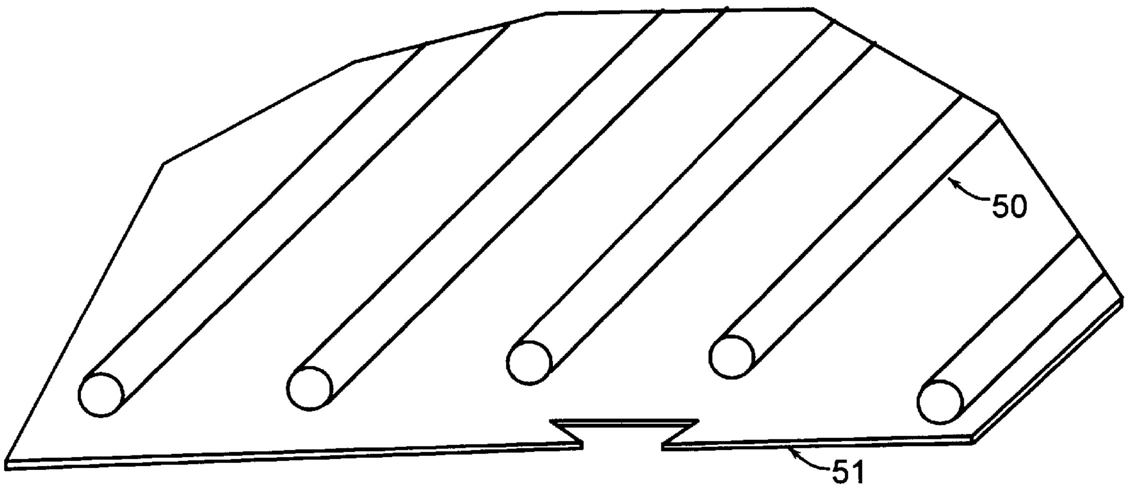
FIG. 9

COOLING VANES FOR ROTATING ELECTRIC MACHINERY

FIELD OF THE INVENTION

The invention relates to the field of cooling devices for rotating electric machines and more specifically to cooling vanes for rotating electric machines.

BACKGROUND OF THE INVENTION

Rotating electric machines such as generators and motors include a stationary set of current carrying members (winding) which pass through a magnetically conductive core. This component is collectively called a stator. There is also a movable set of current carrying members (winding) which pass through a magnetically conductive core. This component is collectively called a rotor. Each stator and rotor is typically constructed of a series of relatively thin magnetically conductive plates which are typically laminated together to form the respective stator or rotor core.

Eddy currents are produced in the cores of the stator and rotor as a result of fluctuating magnetic fields. These currents as well as the current in the windings of the stator and rotor cause resistive heating. In order to maintain device efficiency and lifetime this heat must be dissipated to prevent distortion, changes in the electrical properties and heat damage to the components of the electric machine. One method for cooling the plates known to the prior art is to attach a series of thermally conductive vanes to the surface of the plate. As an example, FIG. 1 depicts a plan view of a stator element 10 which includes a relatively thin stator plate 14 attached to which are a series of vanes 18. The vanes 18 are attached radially to the stator plate 14. These vanes 18 also serve as structural members maintaining a gap through which a cooling fluid may pass to remove heat.

FIG. 2 depicts a perspective view of a section of stator element 10 showing the stator plate 14 and vanes 18. The vanes 18 are generally I-beam in shape and are typically attached by welding to the stator plate. The amount of heat transferred to the cooling fluid is a function of the thermal conductivity and surface area of the vanes as well as the turbulence of the fluid flow.

SUMMARY OF THE INVENTION

The invention relates to a cooling vane for use in a rotating electric machine such as a generator or motor and method for attachment of the vane to plates within the machine. In one embodiment the cooling vane is a corrugated ribbon of thermally conductive material, such as a metal. A plurality of projection points are positioned along one edge of the corrugated ribbon.

In one embodiment, the method of welding a cooling vane having the projection points to a plate, such as a stator plate, is accomplished by electrically grounding the plate, positioning the cooling vane perpendicularly adjacent the grounded stator plate and applying a high current source to the cooling vane in the region of the projection point. The high current flow through the projection point to the plate welds the cooling vane to the plate in the region of the projection point.

In another embodiment the vane is periodically twisted to bring a portion of the vane parallel to the plane of the plate to which the vane is to be attached. Conventional point resistance welding can then be used to attach the two structures. In another embodiment, a dimple is located in the parallel portion of the vane to concentrate current flowing between the vane and the plate during a welding operation thereby welding the vane to the plate.

BRIEF DESCRIPTION OF THE DRAWINGS

These and other features and advantages of the invention will be more readily understood in view of the accompanying specification and drawing in which:

FIG. 7 is a perspective view of another embodiment of the vane of the invention; and FIG. 8 is a side view of the embodiment of the vane of the invention shown in FIG. 7 positioned for welding on a plate.;

FIG. 9 is a perspective view of an embodiment of a section of a stator plate with radial cooling vanes that have a circular cross section.

DETAILED DESCRIPTION OF THE INVENTION

Figure 3:
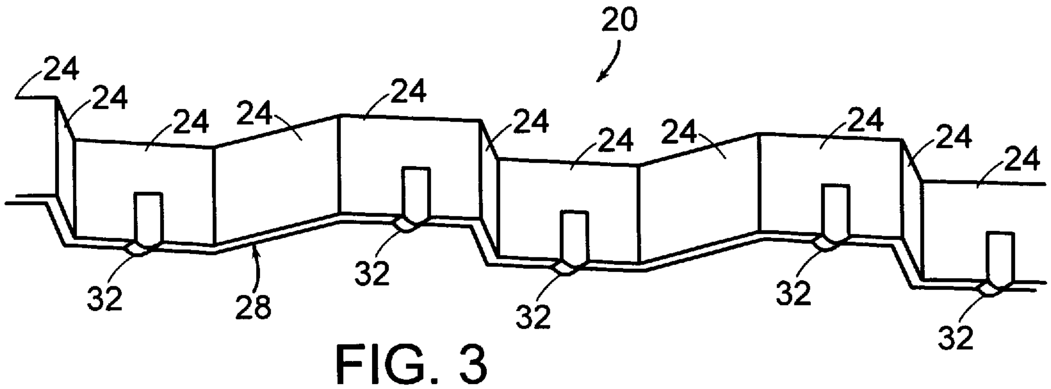
FIG. 3 is a perspective view of an embodiment of a vane of the invention.

Referring to FIG. 3, in one embodiment, the vane 20 of the invention is a long narrow ribbon of thermally conductive material, in one embodiment steel, which is folded into a three dimensional corrugated shape. It should be noted that the term ribbon is not limited to a ribbon of rectangular cross-section, but may include circular or other cross-sections. In the embodiment shown the corrugation takes the form of a series of intersecting planar surfaces 24, but other forms are envisioned including a smooth sinusoidal or serpentine curve. Although steel is used in the embodiment of the vane 20 shown, other thermally conductive materials are contemplated. Composite materials which exhibit high strength and high thermal conductivity may be used.

In the embodiment shown, the corrugations increase the linear length of the ribbon by as much as 33 percent. It is possible to raise or lower the percentage increase in length by adjusting the angle between the adjacent planes in the corrugation, or by decreasing the wavelength in vanes with a sinusoidal curve. It should be noted that a corrugated vane is stronger than a straight I-beam whose web is the same thickness as the corrugated material. The optimum configuration (vane material, thickness of vane material, corrugation shape, vane width, and corrugation size) is determined by the specific strength requirements of the core assembly and the fluid flow parameters in order to obtain the best possible heat transfer characteristics. Other non-performance related requirements such as weight and ease of assembly need to be considered also.

Thus, the lower limit on the thickness of the vanes may be determined by the compressive strength required and the upper limit determined by the total plate and vane weight for ease of assembly. It should also be noted that the limit to the corrugation depth is related to the pressure drop developed in the fluid.

In one embodiment, along one edge 28 of the vane 20 are fashioned a series of projection points 32. In one embodiment these projection points 32 are impressed or swedged into the ribbon during the corrugation of the ribbon. In one embodiment these projection points 32 are located on alternate planes or segments 24 of the corrugated ribbon. Other embodiments are envisioned in which the projection points 32 are positioned on more or fewer segments 24. In yet another embodiment a corrugated ribbon without projection points is welded to the plate.

Figure 1:
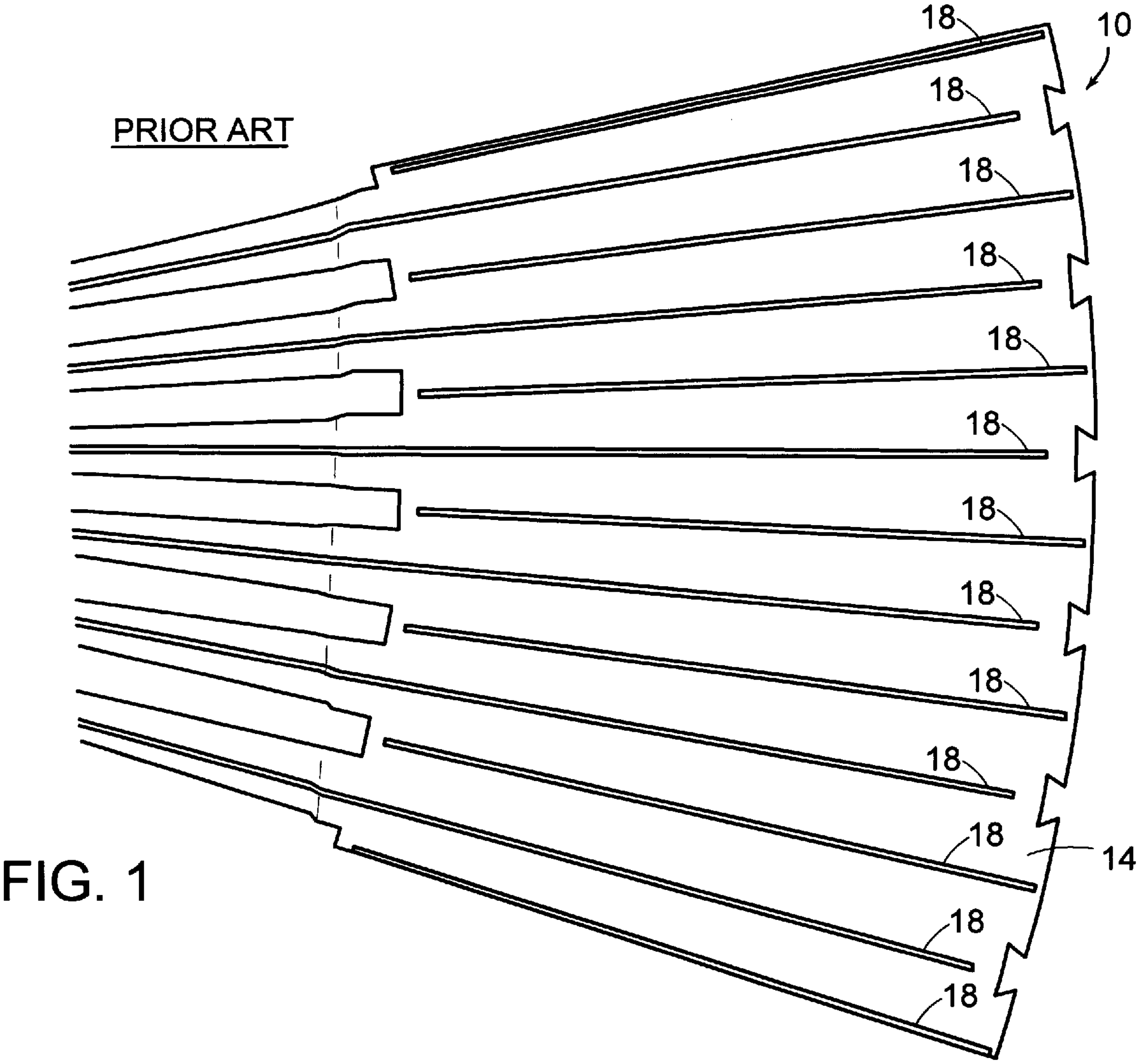
FIG. 1 is a plan view of a stator plate with radial cooling vanes known to the prior art.
Figure 4:
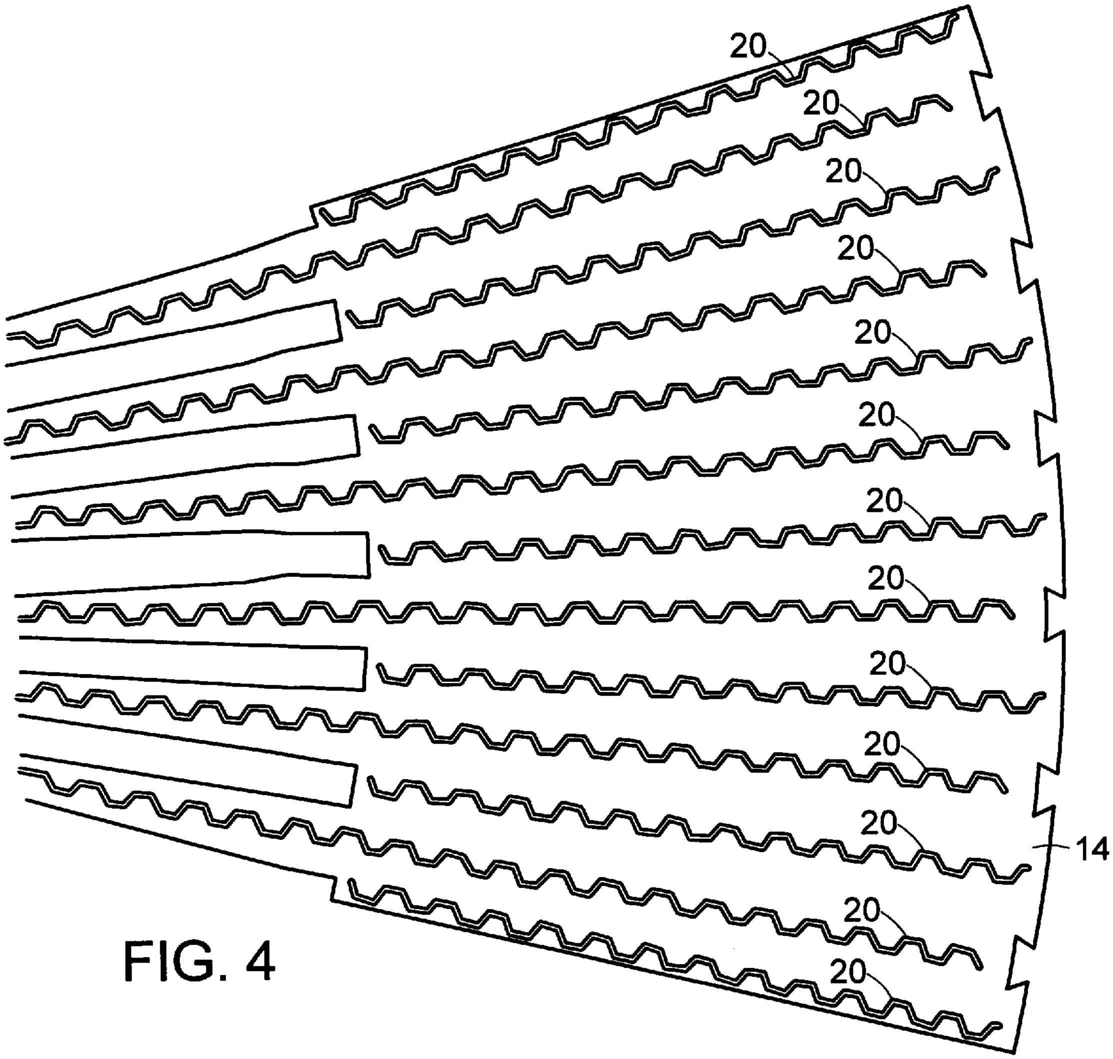
FIG. 4 is a plan view of a stator plate with the embodiment of vane of the invention shown in FIG. 3.
Figure 5:
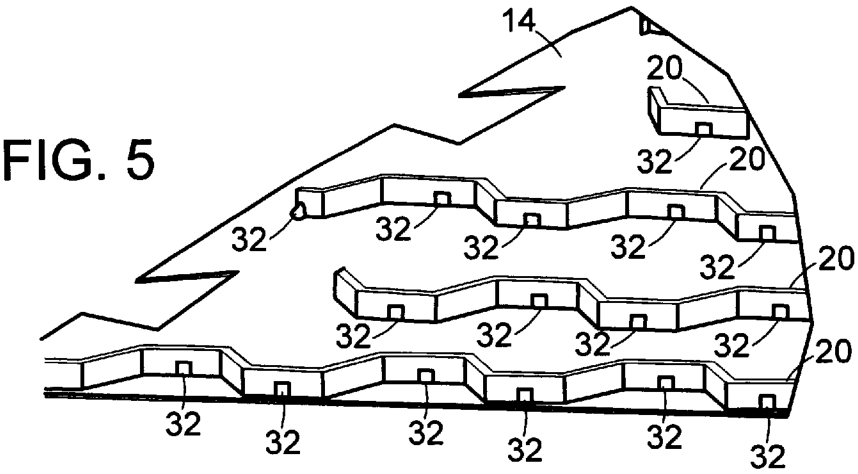
FIG. 5 is a perspective view of the stator plate of FIG. 4 with the embodiment of the vane of the invention.

Referring to FIG. 4, a plan view of the same type of stator plate is shown as was shown in FIG. 1, but with the vanes 20 of the invention. This diagram illustrates the increase in surface area of the vanes 20 due to the increased length of the vane 20. The corrugated shape increases the surface area of the vane 20 thereby increasing the ability of the vane 20 to dissipate heat emanating from the stator plate 14 by exposing more surface area of the vane to airflow between the vanes 20, and also promotes turbulence in the airflow thereby further increasing the vane's ability to dissipate heat. FIG. 5 depicts a perspective view of a section of the stator plate 14 of FIG. 4, which shows the positioning of the vanes 20 on the stator plate 14.

Figure 6:
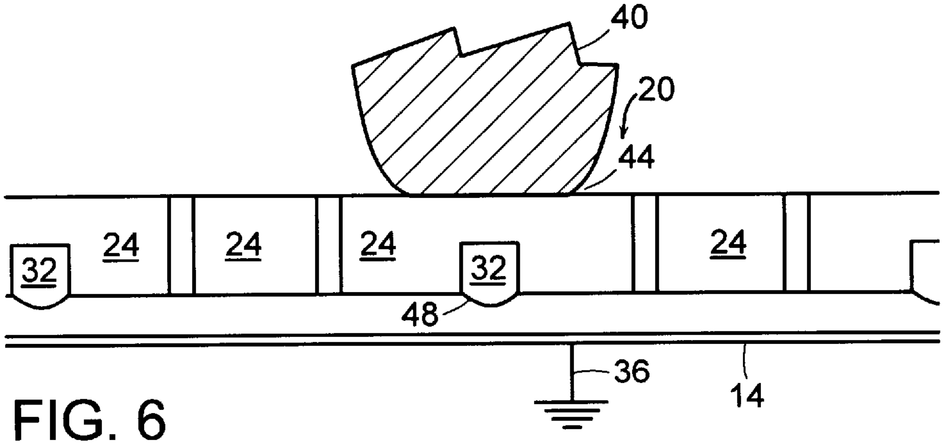
FIG. 6 is a side view of the embodiment of the vane of the invention shown in FIG. 3 in position for welding on a plate.

Referring to FIG. 6, to weld the vane 20 of the invention to a plate 14, the plate is grounded 36, and the projection points 32 of the vane 20 brought into contact with the plate 14. A high current welding probe 40 is brought into contact with a region near the projection point 32 and current passing between the contact point 48 of the projection point 32 and the grounded plate 14 causes the projection point 32 and the plate 14 to weld together. It is also possible to ground the vane 20 and apply the welding probe 40 to the plate 14. The important thing is that the current passes through a reduced region of the vane 20, the projection point 32, as opposed to dissipating over a wider contact area resulting in either excessive heating and the destruction of the components or a failed or weak weld.

Referring to FIG. 7, another embodiment of the vane 20' is similar to the vane 20 in the previous embodiment shown in FIG. 3, but instead of having projection points 32 positioned on alternate corrugation planes 24, one of the corrugation planes 54 is rotated 90 degrees to the plane of the vane 20' and therefore parallel to the plane of the plate 14 to which the vane 20' is to be welded. The rotation of corrugation plane 54 causes adjacent planes 52 to be folded. The rotated plane of the corrugation material may then be welded using point type resistance welding. In another embodiment a dimple (not shown) is positioned in the rotated plane 54 to concentrates the current flow between the vane 20' and the plate 14 during welding. Unlike the previous embodiment, these rotated planes 54 need not be located on each adjacent corrugation planes.

FIG. 8 depicts a side view of the second embodiment of the vane 20' in position for welding. Again, the welding probe 40 is placed in the vicinity of the rotated plane 54, thereby concentrating a high current in the vicinity of the plane 54 in contact with the grounded plate 14.

Figure 2:
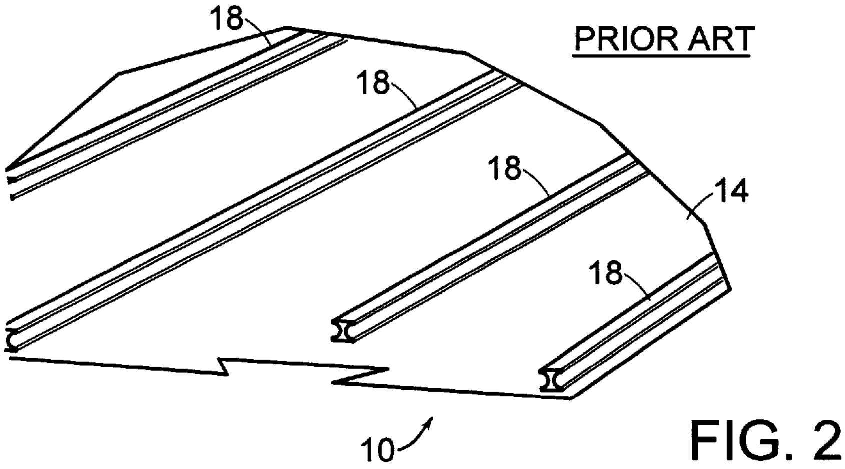
FIG. 2 is a perspective view of a section of the stator plate with radial cooling vanes shown in FIG. 1.

FIG. 9 depicts a perspective view similar to that shown in FIG. 2. In the embodiment shown, the cooling vanes with a circular cross section 50 are attached to a stator plate 51. Although steel is used in the embodiment of the cooling vane 50 shown, other thermally conductive materials are contemplated. Composite materials which exhibit high strength and high thermal conductivity may be used.

Thus the present invention provides both a vane with increased surface area and a method of welding the vane to the plate in an easy and cost effective manner.

It is understood that other modifications or embodiments are possible which will still be within the scope of the appended claims. These and other examples of the concept of the invention illustrated above are intended by way of example and the actual scope of the invention is to be determined solely from the following claims.

What is claimed is:

1. A stator element comprising:

a stator plate; and a plurality of cooling vanes, each said cooling vane comprising a corrugated thermally conductive ribbon and a plurality of projection points positioned along one edge of said ribbon, each said ribbon being oriented radially with respect to the stator plate and welded to said stator plate at said projections, each of said projections being located at a location on said stator plate without holes.

2. The stator element of claim 1 wherein the cooling vane when assembled to a plate in a rotating electric machine has a higher coefficient of heat transfer than a non-corrugated vane.

3. The cooling vane of claim 1 wherein the corrugation is angular.

4. The cooling vane of claim 1 wherein the corrugation is serpentine.

5. The cooling vane of claim 1 wherein each of said plurality of projections is positioned on a respective corrugation.

6. The cooling vane of claim 1 wherein said thermally conductive corrugated material is steel.

7. The cooling vane of claim 1 wherein said corrugated cooling vane, when assembled to a plate in said rotating electric machine, is longer in linear length than a linear vane in the same location on said plate.

8. The cooling vane of claim 1 wherein said corrugated vane produces turbulence in a cooling fluid introduced to cool said plate.

9. The cooling vane of claim 1 wherein said ribbon has a circular cross-section.

10. The cooling vane of claim 1 wherein said ribbon has a rectangular cross-section.

11. The cooling vane of claim 1 wherein said ribbon has an I-beam cross-section.

12. A stator comprising:

a plurality of stator elements, each said stator element comprising:

a stator plate and a plurality of cooling vanes, each said cooling vane comprising:

a corrugated thermally conductive ribbon and a plurality of projection points positioned along one edge of said ribbon, each said ribbon being oriented radially with respect to the stator plate and welded to said stator plate at said projections, each of said projections being located at a location on said stator plate without holes.

13. A rotating electric machine comprising:

a stator; and a rotor, each said stator comprising a plurality of stator elements, each said stator element comprising a stator plate and a plurality of cooling vanes, each said cooling vane comprising a corrugated thermally conductive ribbon and a plurality of projection points positioned along one edge of said ribbon, each said ribbon being oriented radially with respect to the stator plate and welded to said stator plate at said projections, each of said projections being located at a location on said stator plate without holes.

14. The cooling vane of claim 13 wherein said corrugations are angular.

15. A method for attaching a cooling vane to a plate, said method comprising the steps of:

providing a ribbon of corrugated thermally conductive material having a plurality of projections along one edge of said ribbon;

positioning said ribbon perpendicularly adjacent to said plate with said projections touching said plate at a location on said plate without holes; and applying a high current between each of said projection and said plate.

16. A stator element for a rotating electric machine, comprising:

a stator plate; and a plurality of cooling vanes, each said cooling vane comprising a ribbon of thermally conductive corrugated material having a plurality of vane sections oriented substantially at 90 degrees to the plane of the vane, said vane sections having a plurality of projection points along one edge of said ribbon, each said ribbon being oriented radially with respect to the stator plate and welded to said stator plate at said projections, each of said projections being located at a location on said stator plate without holes.

17. The cooling vane of claim 16 wherein each said vane section oriented substantially at 90 degrees to the plane of the vane has a welding dimple located within the plane.

* * * * *